(12) United States Patent
Gummerman (10) Patent No.: US 9,003,533 B1
(45) Date of Patent: Apr. 7, 2015

(54) SYSTEMS AND METHODS FOR DETECTING MALWARE

(75) Inventor: Lee Gummerman, Camarillo, CA (US)

(73) Assignee: Symantec Corporation, Mountain View, CA (US)

( * ) Notice: Subject to any disclaimer, the term of this patent is extended or adjusted under 35 U.S.C. 154(b) by 307 days.

(21) Appl. No.: 13/607,398

(22) Filed: Sep. 7, 2012

(51) Int. Cl.
 *G06F 12/14* (2006.01)
 *G06F 21/56* (2013.01)

(52) U.S. Cl.
 CPC ..................................... *G06F 21/566* (2013.01)

(58) Field of Classification Search
 USPC ............. 726/24, 23, 22, 3; 713/188; 707/678, 707/695, 685, 826
 See application file for complete search history.

(56) References Cited

U.S. PATENT DOCUMENTS

| | | | |
|---|---|---|---|
| 6,928,555 B1 * | 8/2005 | Drew ............................... | 726/24 |
| 2004/0083381 A1 * | 4/2004 | Sobel et al. ................... | 713/200 |

OTHER PUBLICATIONS

William E. Sobel, et al; Systems and Methods for Looking Up Anti-Malware Metadata; U.S. Appl. No. 13/048,380, filed Mar. 15, 2011.
Shreyans Mehta, et al; Systems and Methods for Identifying Security Risks in Downloads; U.S. Appl. No. 13/326,995, filed Dec. 15, 2011.

* cited by examiner

*Primary Examiner* — Brian Shaw
(74) *Attorney, Agent, or Firm* — ALG Intellectual Property, LLC (57) ABSTRACT

A computer-implemented method for detecting malware may include 1) identifying a file represented within a file system by a file name, 2) identifying a creation of a hard link to the file that uses an additional file name, 3) updating a database with an association between the file name and the additional file name, 4) identifying a file-closing operation within the file system and determining that the target file name of the file-closing operation was removed from the file system after the file-closing operation, 5) querying the database with the target file name and identifying an existing file name representing the file based on the association, and 6) scanning the existing file name for malware in response to the file-closing operation instead of scanning the target file name because the target file name was removed from the file system. Various other methods, systems, and computer-readable media are also disclosed.

20 Claims, 7 Drawing Sheets

SYSTEMS AND METHODS FOR DETECTING MALWARE

BACKGROUND

Anti-virus and anti-spyware solutions generally employ traditional scan-based technologies to identify viruses, worms, Trojan horses, spyware, and other malware on an endpoint device. Typical anti-virus and anti-spyware solutions may detect these threats by checking files for characteristics (e.g., anti-malware signatures) of known threats. Once an anti-malware system detects a threat, the anti-malware system may remediate the threat, typically by deleting or quarantining the threat.

Some malware may open and write to files (e.g., to propagate itself and/or other malware). Accordingly, some anti-malware systems may scan files once the files are closed (e.g., to check for recently introduced malware). In this manner, anti-malware systems may check files that may have been altered by malware and/or to include malware.

Unfortunately, some malware authors have designed their malware to evade such traditional scan-on-close anti-malware systems. For example, some malware may create a hard link to a file (e.g., an alternate file name for a file), resulting in at least two file names referring to the same file. By opening and infecting the file under one file name (e.g., the alternate file name) and then immediately deleting the file (e.g., deleting the file name under which the file was opened) after closing the file, the malware may prevent some traditional anti-malware systems from scanning the file. For example, a traditional anti-malware system may attempt to open the file using the file name by which the malware opened and closed the file, leaving the file intact (by the other file name not used for opening, modifying, and closing the file) and unscanned. Accordingly, the instant disclosure identifies and addresses a need for additional and improved systems and methods for detecting malware.

SUMMARY

As will be described in greater detail below, the instant disclosure generally relates to systems and methods for detecting malware by tracking the creation of hard links to files and the tracked hard link information to scan recently closed files even when file names used to open the recently closed files are subsequently deleted (e.g., by identifying existing file names still linked to the recently closed files and accessing the recently closed files via the existing file names). In one example, a computer-implemented method for detecting malware may include 1) identifying a file represented within a file system by a file name, 2) identifying a creation of a hard link to the file (the hard link representing the file within the file system by an additional file name), 3) updating a database with an association between the file name and the additional file name in response to the creation of the hard link to the file, 4) identifying a file-closing operation within the file system and determining that the target file name of the file-closing operation was removed from the file system after the file-closing operation, 5) querying the database with the target file name and identifying an existing file name representing the file in response based on the association (the target file name matching one of the file name and the additional file name, and the existing file name matching the other of the file name and the additional file name that does not match the target file name), and 6) scanning the existing file name for malware in response to the file-closing operation instead of scanning the target file name because the target file name was removed from the file system.

In some examples, identifying the creation of the hard link may include creating the hard link to the file in response to identifying a previous creation of a prior hard link to the file. In these examples, the computer-implemented method may also include 1) identifying a removal of a penultimate hard link to the file and 2) removing the hard link to the file in response to identifying the removal of the penultimate hard link.

In some embodiments, the computer-implemented method may also include 1) identifying a file-renaming operation within the file system to change the file name to a new file name and 2) updating the association within the database to associate the new file name with the additional file name in response to the file-renaming operation. Additionally or alternatively, the computer-implemented method may include 1) identifying a file-renaming operation within the file system to change the additional file name to a new file name and 2) updating the association within the database to associate the new file name with the file name in response to the file-renaming operation.

In one example, updating the database may include associating the additional file name with an inode of the file within the database. In one embodiment, the file-closing operation may close the file via the target file name after modifying the file via the target file name to introduce malware to the file. In some examples, determining that the target file name of the file-closing operation was removed may include attempting and failing to access the target file name. In these examples, attempting and failing to access the target file name may include attempting to scan the target file name for malware in response to the file-closing operation.

In some examples, the computer-implemented method may also include 1) identifying a removal of the hard link to the file and 2) updating the database to remove the association between the file name and the additional file name.

In one embodiment, a system for implementing the above-described method may include 1) an identification module programmed to (i) identify a file represented within a file system by a file name and (ii) identify a creation of a hard link to the file (the hard link representing the file within the file system by an additional file name), 2) an update module programmed to update a database with an association between the file name and the additional file name in response to the creation of the hard link to the file, 3) a determination module programmed to identify a file-closing operation within the file system and determine that a target file name of the file-closing operation was removed from the file system after the file-closing operation, 4) a querying module programmed to query the database with the target file name and identify an existing file name representing the file in response based on the association (the target file name matching one of the file name and the additional file name, and the existing file name matching the other of the file name and the additional file name that does not match the target file name), and 5) a scanning module programmed to scan the existing file name for malware in response to the file-closing operation instead of scanning the target file name because the target file name was removed from the file system. The system may also include at least one processor configured to execute the identification module, the update module, the determination module, the querying module, and the scanning module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a file represented within a file system by a file name, 2) identify a creation of a hard link to the file (the hard link representing the file within the file system by an additional file name), 3) update a database with an association between the file name and the additional file name in response to the creation of the hard link to the file, 4) identify a file-closing operation within the file system and determine that a target file name of the file-closing operation was removed from the file system after the file-closing operation, 5) query the database with the target file name and identify an existing file name representing the file in response based on the association (the target file name matching one of the file name and the additional file name, and the existing file name matching the other of the file name and the additional file name that does not match the target file name), and 6) scan the existing file name for malware in response to the file-closing operation instead of scanning the target file name because the target file name was removed from the file system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting malware. As will be explained in greater detail below, by tracking the creation of hard links to files and the tracked hard link information to scan recently closed files even when file names used to open the recently closed files are subsequently deleted (e.g., by identifying existing file names still linked to the recently closed files and accessing the recently closed files via the existing file names), the systems and methods described herein may effectively prevent malware from evading scan-on-close techniques for identifying malware injections.

The following will provide, with reference to FIGS. 1-2 and 4-5, detailed descriptions of exemplary systems for detecting malware. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
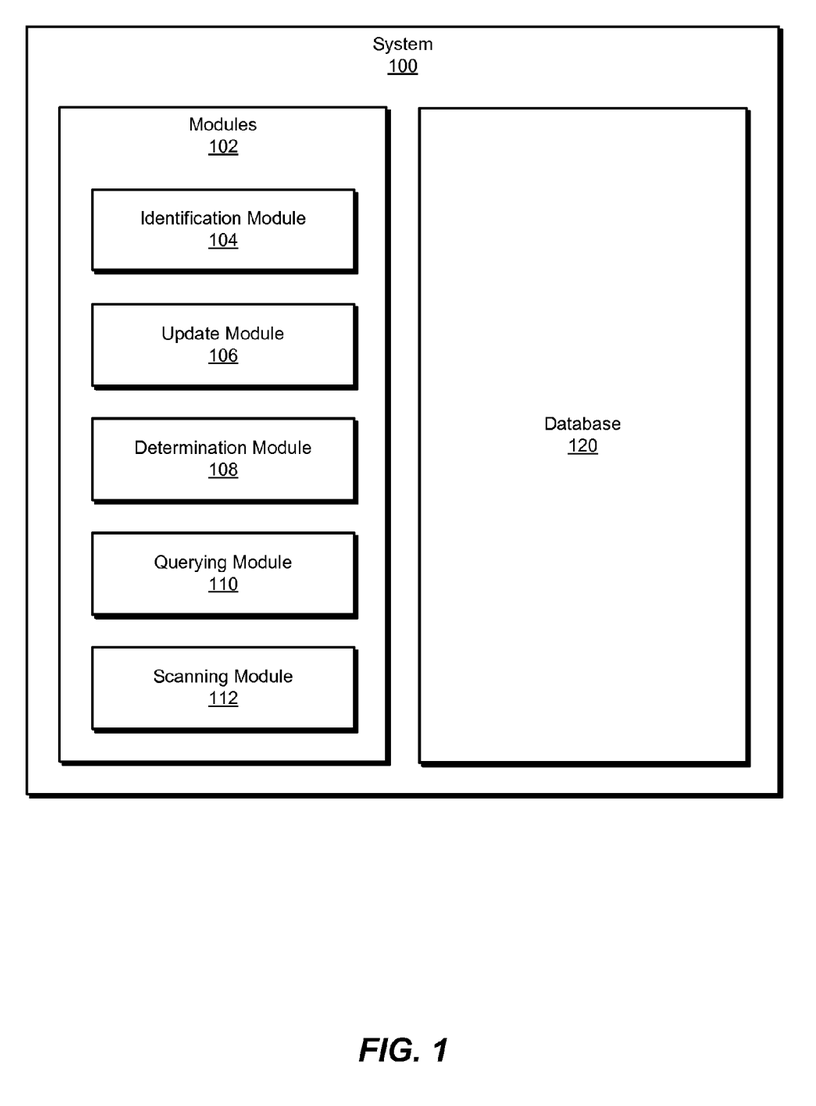
FIG. 1 is a block diagram of an exemplary system for detecting malware.

FIG. 1 is a block diagram of an exemplary system 100 for detecting malware. As illustrated in this figure, exemplary system 100 may include one or more modules 102 for performing one or more tasks. For example, and as will be explained in greater detail below, exemplary system 100 may include a an identification module 104 programmed to (i) identify a file represented within a file system by a file name and (ii) identify a creation of a hard link to the file (the hard link representing the file within the file system by an additional file name). Exemplary system 100 may also include an update module 106 programmed to update a database with an association between the file name and the additional file name in response to the creation of the hard link to the file.

In addition, and as will be described in greater detail below, exemplary system 100 may include a determination module 108 programmed to identify a file-closing operation within the file system and determine that a target file name of the file-closing operation was removed from the file system after the file-closing operation. Exemplary system 100 may also include a querying module 110 programmed to query the database with the target file name and identify an existing file name representing the file in response based on the association (the target file name matching one of the file name and the additional file name, and the existing file name matching the other of the file name and the additional file name that does not match the target file name). Exemplary system 100 may further include a scanning module 112 programmed to scan the existing file name for malware in response to the file-closing operation instead of scanning the target file name because the target file name was removed from the file system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store data useful for identifying alternate file names for files (e.g., for files with multiple hard links). For example, as will be explained in greater detail below, database 120 may store associations between file names referencing the same file and/or associations between hard links and files.

Database 120 may represent portions of a single database or computing device or a plurality of databases or computing devices. For example, database 120 may represent a portion of computing device 202 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as computing device 202 in FIG. 2, computing system 610 in FIG. 6, and/or portions of exemplary network architecture 700 in FIG. 7.

Figure 2:
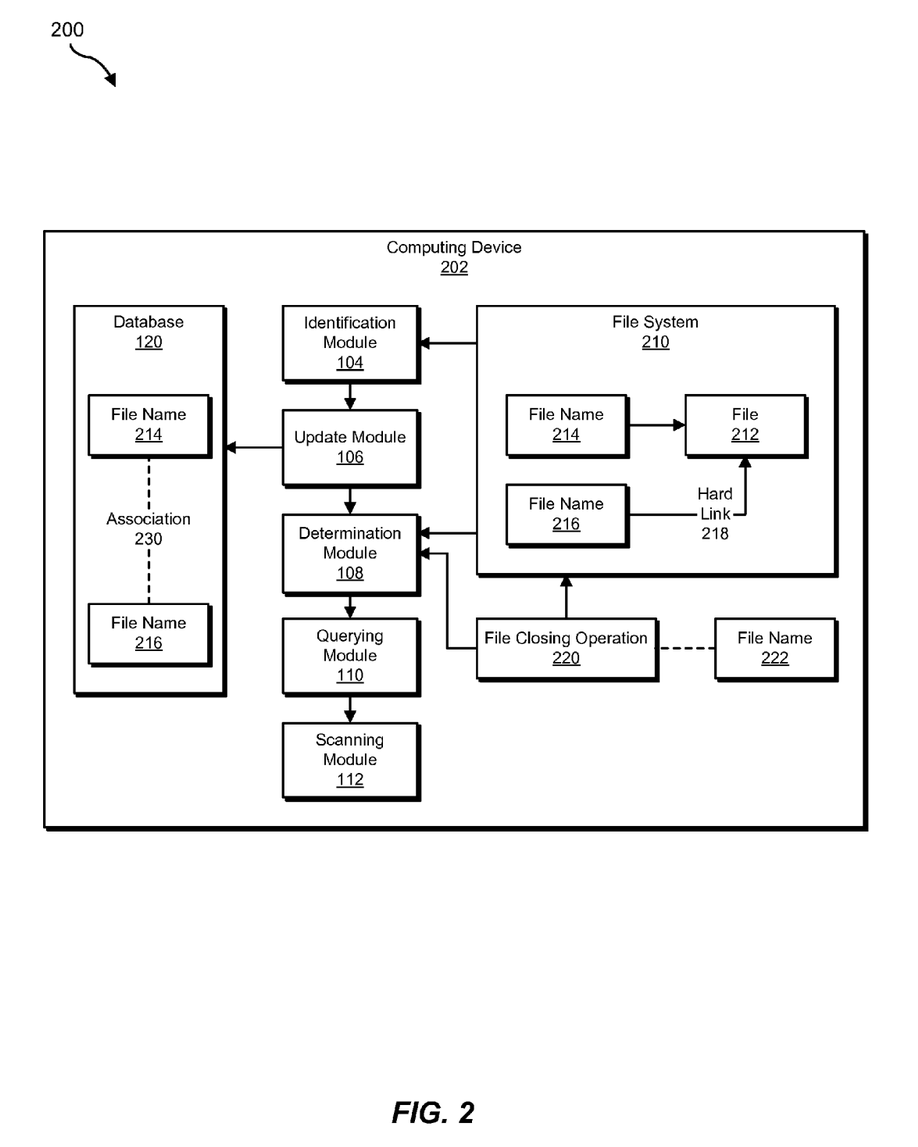
FIG. 2 is a block diagram of an exemplary system for detecting malware.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 with access to a file system 210. Computing device 202 may be programmed with one or more of modules 102 and/or may store all or a portion of the data in database 120. Additionally or alternatively, one or more devices accessible to computing device 202 may be programmed with one or more of modules 102 and/or may store all or a portion of the data in database 120.

In one embodiment, one or more of modules 102 from FIG. 1 may, when executed by at least one processor of computing device 202, facilitate computing device 202 in detecting malware. For example, and as will be described in greater detail below, one or more of modules 102 may cause computing device 202 to 1) identify a file 212 represented within file system 210 by a file name 214, 2) identify a creation of a hard link 218 to file 212 (hard link 218 representing file 212 within file system 210 by an additional file name 216), 3) update database 120 with an association 230 between file name 214 and file name 216 in response to the creation of hard link 218 to file 212, 4) identify a file-closing operation 220 within file system 210 and determine that a target file name 222 of file-closing operation 220 (e.g., file name 216 or file name 214) was removed from file system 210 after file-closing operation 220, 5) query the database with file name 222 and identify an existing file name (e.g., file name 214 or file name 216) representing file 212 in response based on association 230 (file name 222 matching one of file names 214 and 216, and the existing file name in file system 210 matching the other of file names 214 and 216 that does not match file name 222), and 6) scan the existing file name within file system 210 (e.g., file name 214 or 216) for malware in response to file-closing operation 220 instead of scanning file name 222 because file name 222 was removed from file system 210.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 610 in FIG. 6, or any other suitable computing device.

Figure 3:
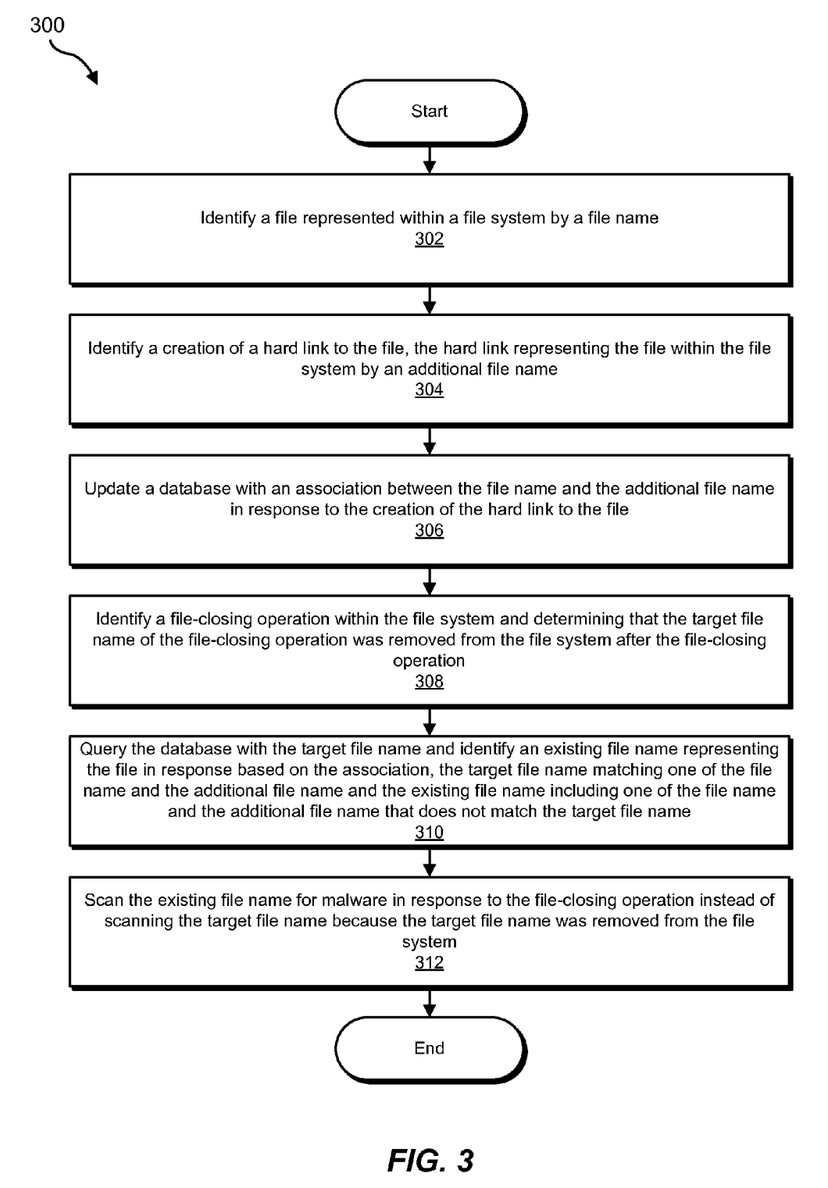
FIG. 3 is a flow diagram of an exemplary method for detecting malware.

FIG. 3 is a flow diagram of an exemplary computer-implemented method 300 for detecting malware. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a file represented within a file system by a file name. For example, at step 302 identification module 104 may, as part of computing device 202 in FIG. 2, identify file 212 represented within file system 210 by file name 214.

As used herein, the term "file" may refer to any unit of data, including, without limitation, files, data objects, images, packages, databases, and documents. The term "file name," as used herein, may refer to any string and/or identifier that references and/or identifies a file stored on a file system. In some examples, a file name may include a file base name, a file path (e.g., using a directory tree structure), a file type, and/or a volume identifier (e.g., using a universally unique identifier ("UUID")). In some examples, a file name may be useful for accessing a file to which the file name refers (e.g., by creating a file descriptor and/or file handle for accessing the file based on the file name). As will be explained in greater detail below, in some examples multiple distinct file names may simultaneously reference a single file. As used herein, the phrase "file system" may refer to any system for organizing, managing, and/or storing files. For example, a file system may organize files by file name (e.g., producing a file handle and/or contents of a file upon receipt of a file name of the file).

Identification module 104 may identify the file in any of a variety of contexts. For example, as will be explained in greater detail below, identification module 104 may identify a creation of a hard link within the file system to the file. Accordingly, identification module 104 may identify the file when identifying the hard link to the file. In some examples, identification module 104 may identify the file by identifying the file name of the file. In some examples, identification module 104 may identify the file by identifying the hard link to the file.

Returning to FIG. 3, at step 304 one or more of the systems described herein may identify a creation of a hard link to the file (the hard link representing the file within the file system by an additional file name). For example, at step 304 identification module 104 may, as part of computing device 202 in FIG. 2, identify the creation of hard link 218 to file 212 (hard link 218 representing file 212 within file system 210 by file name 216).

As used herein, the phrase "hard link" may refer to any file name that references a file and/or any reference by a file name to a file. In some examples, a hard link may differ from a soft link in that a hard link may directly reference a file whereas a soft link may instead reference a file name. Accordingly, in some examples, a hard link may not reference any intermediary file name. In some examples, the hard link may include a directory entry in the file system.

Identification module 104 may identify the creation of the hard link in any of a variety of contexts. For example, identification module 104 may identify the creation of the hard link by intercepting and/or observing the creation of the hard link as a part of a file system filter driver. Additionally or alternatively, identification module 104 may receive a message identifying a new directory entry in the file system and query the file system to determine that the new directory entry represents a hard link to a file. In some examples, the hard link may represent a duplicative hard link to the file. For example, the file may exist within the file system under an original file name (which, in some examples, may be understood as a hard link to the file), and identification module 104 may identify the creation of the hard link as the creation of an alias and/or duplicative file name for the file.

The creation of the hard link may occur in any of a variety of contexts. For example, malware and/or an attacker may directly and/or indirectly create the hard link in an effort to conceal a change to the file from an anti-malware system (e.g., by creating the hard link, opening the file via the hard link, modifying the opened file, closing the file, and immediately deleting the file after closing the file and before the anti-malware system can scan the file via the hard link). In some examples, one or more of the systems described herein may create the hard link. For example, identification module 104 may create the hard link to the file in response to identifying a previous creation of a prior hard link to the file (e.g., the prior hard link having been created by malware to conceal a change to the file from an anti-malware system). As will be described in greater detail below, by creating the hard link, identification module 104 may enable the systems described herein to access and scan the file via the hard link even after malware has changed the file via the prior hard link and deleted the prior hard link.

Returning to FIG. 3, at step 306 one or more of the systems described herein may update a database with an association between the file name and the additional file name in response to the creation of the hard link to the file. For example, at step 306 update module 106 may, as part of computing device 202 in FIG. 2, update database 120 with association 230 between file name 214 and file name 216 in response to the creation of hard link 218 to file 212.

As used herein, the term "database" may refer to any system and/or data structure for storing and/or associating data. Update module 106 may update the database with the association in any of a variety of ways. For example, update module 106 may add a tuple to the database including the file name and the additional file name. Additionally or alternatively, update module 106 may associate the file name with the additional file name by associating the additional file name with an inode of the file within the database. As used herein, the term "inode" may refer to any metadata structure used for locating blocks of a file within a file system and/or any unique identifier of such a metadata structure (e.g., an inode number). Update module 106 may identify the inode of the file in any suitable manner. For example, update module 106 may obtain an inode number of the file by querying the operating system (e.g., via a kernel extension capable of supplying the inode number). In one example, update module 106 may use the file system itself as the database. For example, update module 106 may identify a reserved folder for tracking hard links. Update module 106 may then create a hard link to the file within the reserved folder using the inode number as a name for the hard link. In this example, update module 106 may have created an association between the file name and the additional file name simply by creating an independent hard link to the file represented by both the file name and the additional file name using an inode number associated with both the file name and the additional file name. For example, update module 106 may create a hard link to the file with the path "/reserved_hardlink/volume_id/758010", where "reserved_hardlink" is the name of the reserved folder used by update module 106, "volume_id" is a unique identifier of the volume on which the file resides, and "758010" is the inode of the file.

Figure 4:
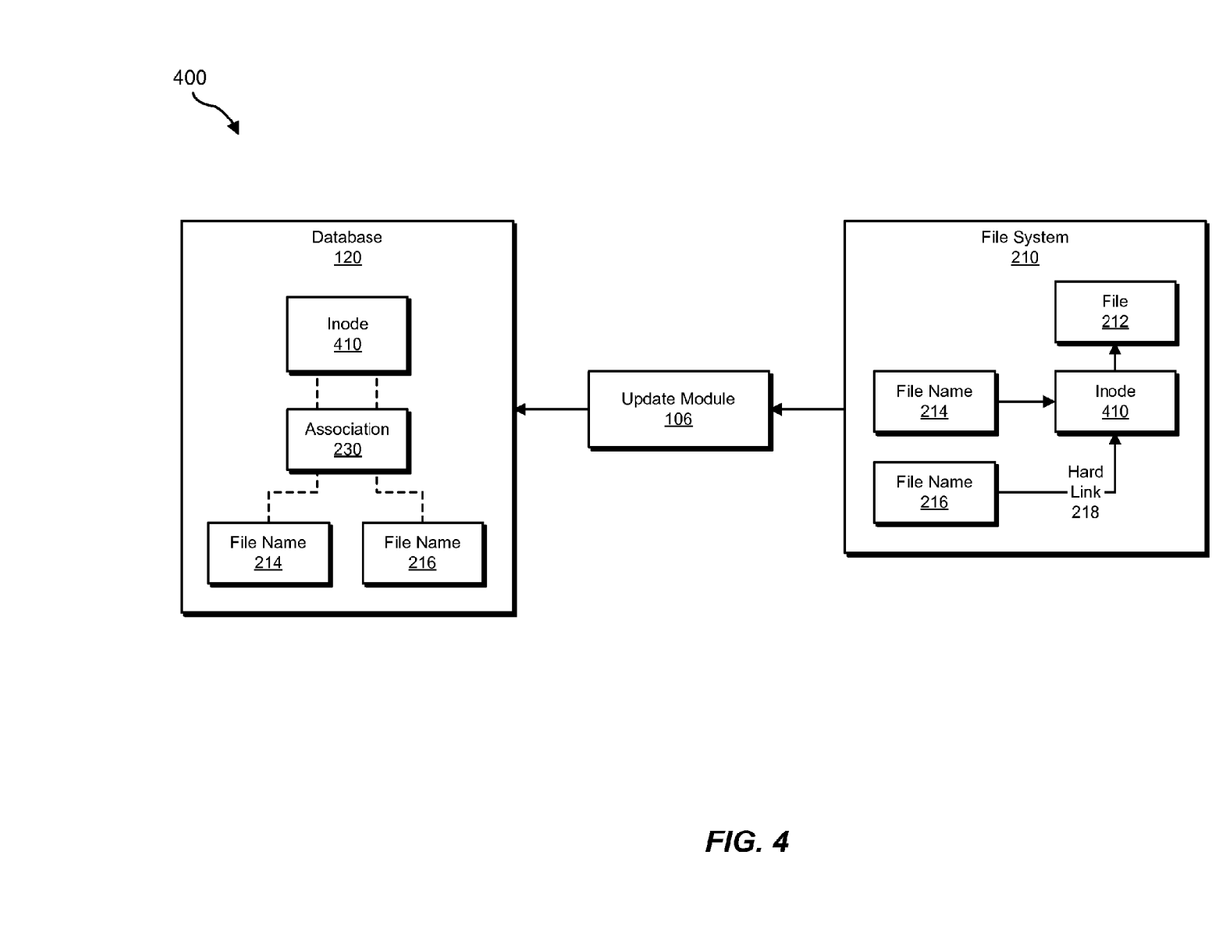
FIG. 4 is a block diagram of an exemplary system for detecting malware.

FIG. 4 illustrates an exemplary system 400 for detecting malware. As shown in FIG. 4, system 400 may include file system 210 and database 120. In one example, update module 106 may update database 120 by associating file name 214 with file name 216. For example, file name 214 may already be associated with an inode 410 of file 212 within database 120. Upon detecting hard link 218 (e.g., file name 216 referencing file 212), update module 106 may identify inode 410 of file 212 and update database 120 by associating file name 216 with inode 410 in database 120. Since file name 214 may already be associated with inode 410 in database 120, update module 106 may have thereby created an association 230 between file name 214 and file name 216.

In some examples, one or more file names represented in the database may change within the file system. In these examples, update module 106 may update the changed file names within the database. For example, update module 106 may 1) identify a file-renaming operation within the file system to change the file name to a new file name and 2) update the association within the database to associate the new file name with the additional file name in response to the file-renaming operation. As used herein, the phrase "file-renaming operation" may refer to any operation that modifies a file name and/or that removes an old file name for a file and replaces the old file name with a new file name for the file. In some examples, the file-renaming operation may include a file-moving operation (e.g., changing the path of a hard link without changing the base file name of the hard link). Update module 106 may identify the file-renaming operation in any suitable manner. For example, update module 106 may operate as a part of a file system filter driver and intercept and/or observe the file-renaming operation. Additionally or alternatively, update module 106 may receive a message identifying the file-renaming operation. As another example, update module 106 may 1) identify a file-renaming operation within the file system to change the additional file name to a new file name and 2) update the association within the database to associate the new file name with the file name in response to the file-renaming operation. Accordingly, update module 106 may keep database 120 up to date even when the file name and/or the additional file name is changed one or more times.

Figure 5:
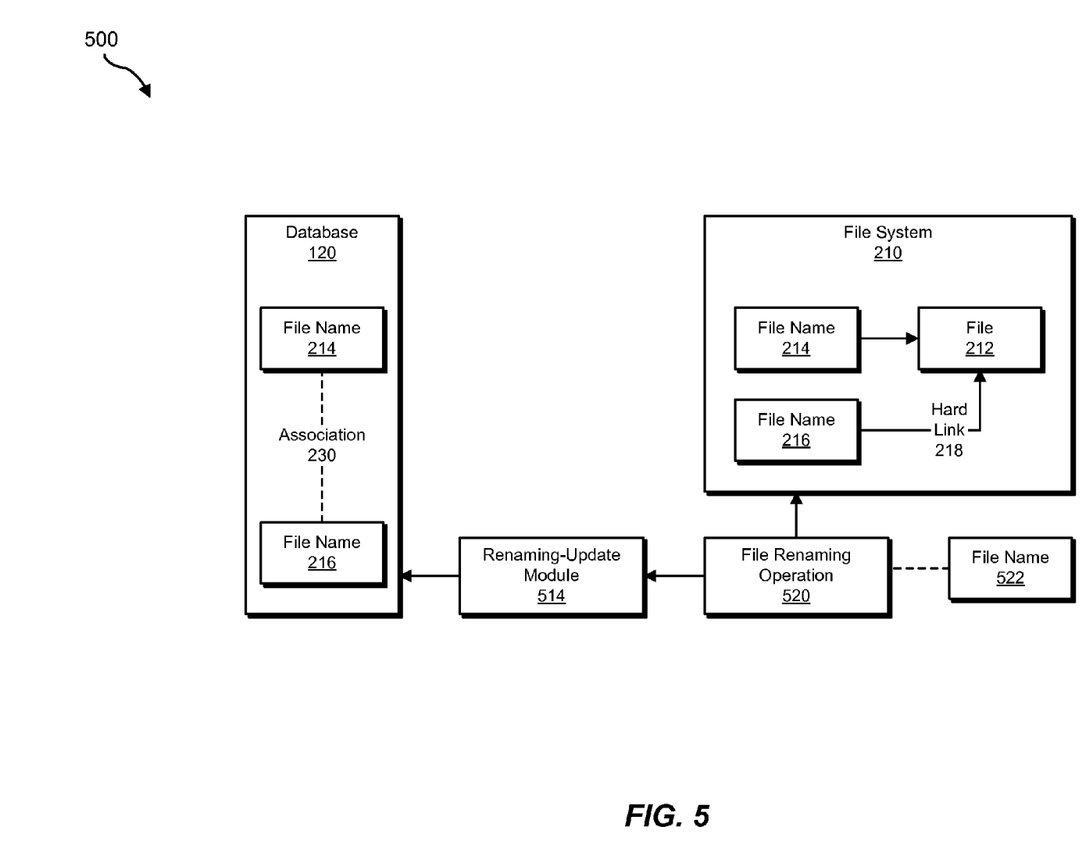
FIG. 5 is a block diagram of an exemplary system for detecting malware.

FIG. 5 illustrates an exemplary system 500 for detecting malware. As shown in FIG. 5, exemplary system 500 may include file system 210 and database 120. Using FIG. 5 as an example, a renaming-update module 514 (e.g., operating separately or as a part of update module 106), may identify a file renaming operation 520 to rename file name 214 with a file name 522. In this example, renaming-update module 520 may update database 120 to replace file name 214 with file name 522, leaving file name 522 associated with file name 216 (e.g., by association 230). As another example, file renaming operation 520 may be to rename file name 216 with file name 522. In this example, renaming-update module 520 may update database 120 to replace file name 216 with file name 522, leaving file name 522 associated with file name 214 (e.g., by association 230).

Returning to FIG. 3, at step 308 one or more of the systems described herein may identify a file-closing operation within the file system and determine that a target file name of the file-closing operation was removed from the file system after the file-closing operation. For example, at step 308 determination module 108 may, as part of computing device 202 in FIG. 2, identify file-closing operation 220 within file system 210 and determine that the target file name 222 of file-closing operation 220 (e.g., file name 216 or file name 214) was removed from file system 210 after file-closing operation 220.

As used herein, the term "file-closing operation" may refer to any operation that may be performed to release access to a file (e.g., after having written to the file). In some examples, the file-closing operation may render a file handle and/or descriptor provided upon opening the file ineffective for accessing the file. In some examples, the file-closing operation may refer to an operation for closing a file previously opened for write access.

Determination module 108 may identify the file-closing operation may occur in any of a variety of contexts. For example, the file-closing operation may close the file via the target file name after modifying the file via the target file name to introduce malware to the file. As used herein, the term "malware" may refer to any virus, worm, Trojan horse, spyware, and/or any other malicious, illegitimate, and/or unauthorized software. In some examples, determination module 108 may identify the file-closing operation by intercepting and/or observing the file-closing operation as a part of a file system filter driver. Additionally or alternatively, determination module 108 may receive a message indicating that the file has been closed. In some examples, determination module may determine that the target file name of the file-closing operation was removed from the file system after the file-closing operation by attempting and failing to access the target file. For example, determination module 108 may attempt to scan the target file name for malware in response to the file-closing operation, but fail to open the file for scanning via the target file name (e.g., instead receiving an error indicating that the target file name could not be found by the file system). Additionally or alternatively, determination module 108 may receive a message from an anti-malware system that an attempt to access the target file name failed.

Returning to FIG. 3, at step 310 one or more of the systems described herein may query the database with the target file name and identify an existing file name representing the file in response based on the association (the target file name matching one of the file name and the additional file name, and the existing file name matching the other of the file name and the additional file name that does not match the target file name). For example, at step 310 querying module 110 may, as part of computing device 202 in FIG. 2, query the database with file name 222 and identify an existing file name (e.g., file name 214 or file name 216) representing file 212 in response based on association 230 (file name 222 matching one of file names 214 and 216, and the existing file name in file system 210 matching the other of file names 214 and 216 that does not match file name 222).

Querying module 110 may query the database with the target file name in any of a variety of contexts. For example, the target file name may match the additional file name (e.g., because malware opened, modified, and closed the additional file name after creating the hard link). In this example, querying module 110 may query the database with the target file name matching the additional file name and receive the file name in response (e.g., the file name matching the remaining existing file name in the file system that references the file). As another example, the target file name may match the file name (e.g., because malware opened, modified, and closed the file name after creating the hard link using the additional file name). In this example, querying module 110 may query the database with the target file name matching the file name and receive the additional file name in response (e.g., the additional file name matching the remaining existing file name in the file system that references the file).

Querying module 110 may query the database in any suitable manner. For example, the database may include a relational database and querying module 110 may submit a relational database query to the database. Additionally or alternatively, the database may include a data structure (e.g., a hash table, a linked list, etc.) and querying module 110 may query the database by searching the data structure for the target file name.

As mentioned earlier, in one example the database may include the file system itself. For example, one or more of the systems described herein may have created a hard link within the file system named with the inode of the file. Following an earlier example, one or more of the systems described herein may have created a hard link to the file with the path "/reserved_hardlink/volume_id/758010", where "reserved_hardlink" is the name of the reserved folder used by update module 106, "volume_id" is a unique identifier of the volume on which the file resides, and "758010" is the inode of the file. Accordingly, querying module 110 may query the database by seeking the existence of a hard link at the path "/reserved_hardlink/volume_id/758010" (e.g., based on having identified the volume and inode of the target file name).

Returning to FIG. 3, at step 312 one or more of the systems described herein may scan the existing file name for malware in response to the file-closing operation instead of scanning the target file name because the target file name was removed from the file system. For example, at step 312 scanning module 112 may, as part of computing device 202 in FIG. 2, scan the existing file name within file system 210 (e.g., file name 214 or 216) for malware in response to file-closing operation 220 instead of scanning file name 222 because file name 222 was removed from file system 210.

Scanning module 112 may perform any suitable scan of the file. As used herein, the term "scan" may refer to any security assessment, analysis, and/or scan. For example, the scan may include a scan for one or more malware signatures in the file, a scan for a security vulnerability that may be facilitated by the file, etc. By scanning using the existing file name (e.g., whichever of the file name and the additional file name that was not used by malware to open, modify, and close the file, and which was not subsequently deleted by the malware), the systems and methods described herein may effectively perform a scan-on-close operation on the file despite an attempt by malware to conceal the contents of and/or changes to the file from scan-on-close systems.

In some examples, one or more of the systems described herein may also update the database once the hard link to the file is removed. For example, update module 106 may identify a removal of the hard link to the file and update the database to remove the association between the file name and the additional file name (e.g., by removing an entry for the additional file name from the database, by removing a directory entry for the inode of the file from a reserved folder, etc.).

As mentioned earlier, in some examples, one or more of the systems described herein may have created the hard link. For example, identification module 104 may have created the hard link to the file in response to identifying a previous creation of a prior hard link to the file that was created by malware. In these examples, identification module 104 may at a later time identify a removal of a penultimate hard link to the file. Identification module 104 may then remove the hard link to the file in response to identifying the removal of the penultimate hard link. For example, identification module 104 may determine that the hard link created earlier by identification module 104 is the last remaining hard link to the file, and that therefore the hard link is no longer needed and/or that the file is to be deleted, since no references to the file may remain aside from the reference created by identification module 104 for purposes of preventing scan-on-close evasions by malware. Accordingly, identification module 104 may delete the hard link and/or file in these examples.

As explained above, by tracking the creation of hard links to files and the tracked hard link information to scan recently closed files even when file names used to open the recently closed files are subsequently deleted (e.g., by identifying existing file names still linked to the recently closed files and accessing the recently closed files via the existing file names), the systems and methods described herein may effectively prevent malware from evading scan-on-close techniques for identifying malware injections.

Figure 6:
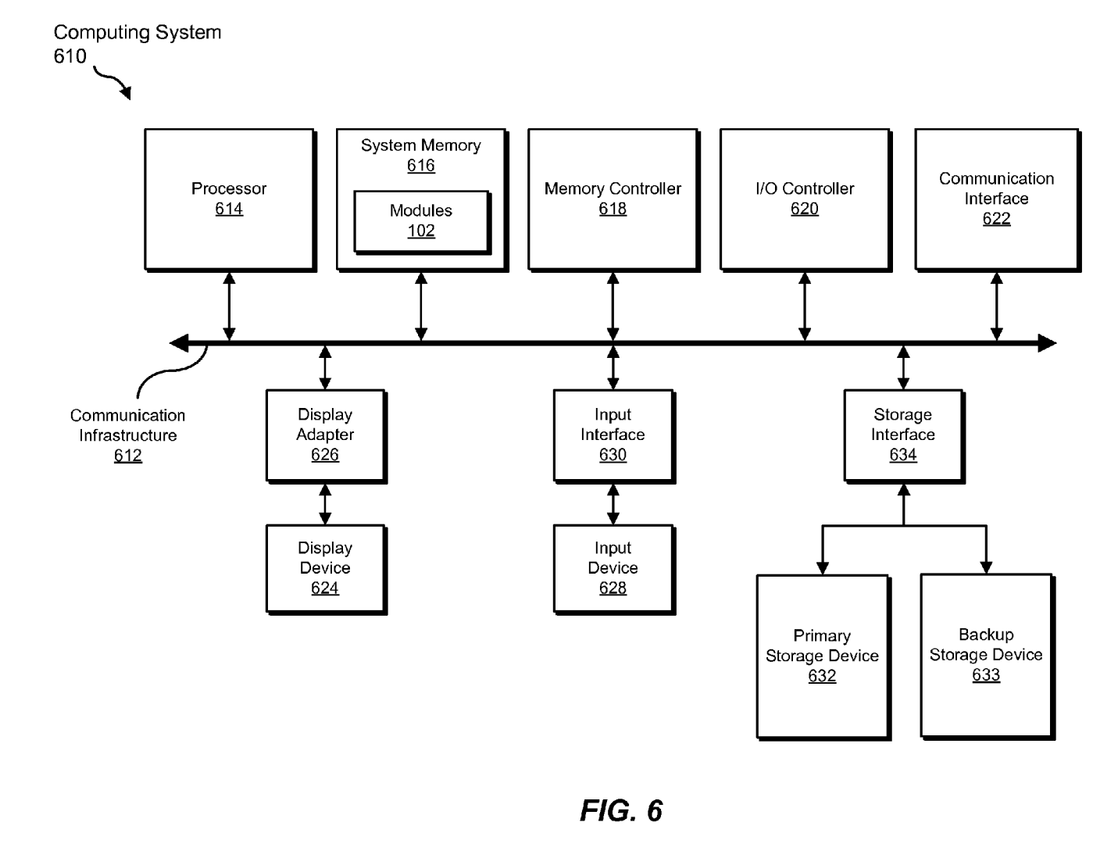
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, creating, updating, associating, determining, closing, modifying, attempting, scanning, querying, and removing steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
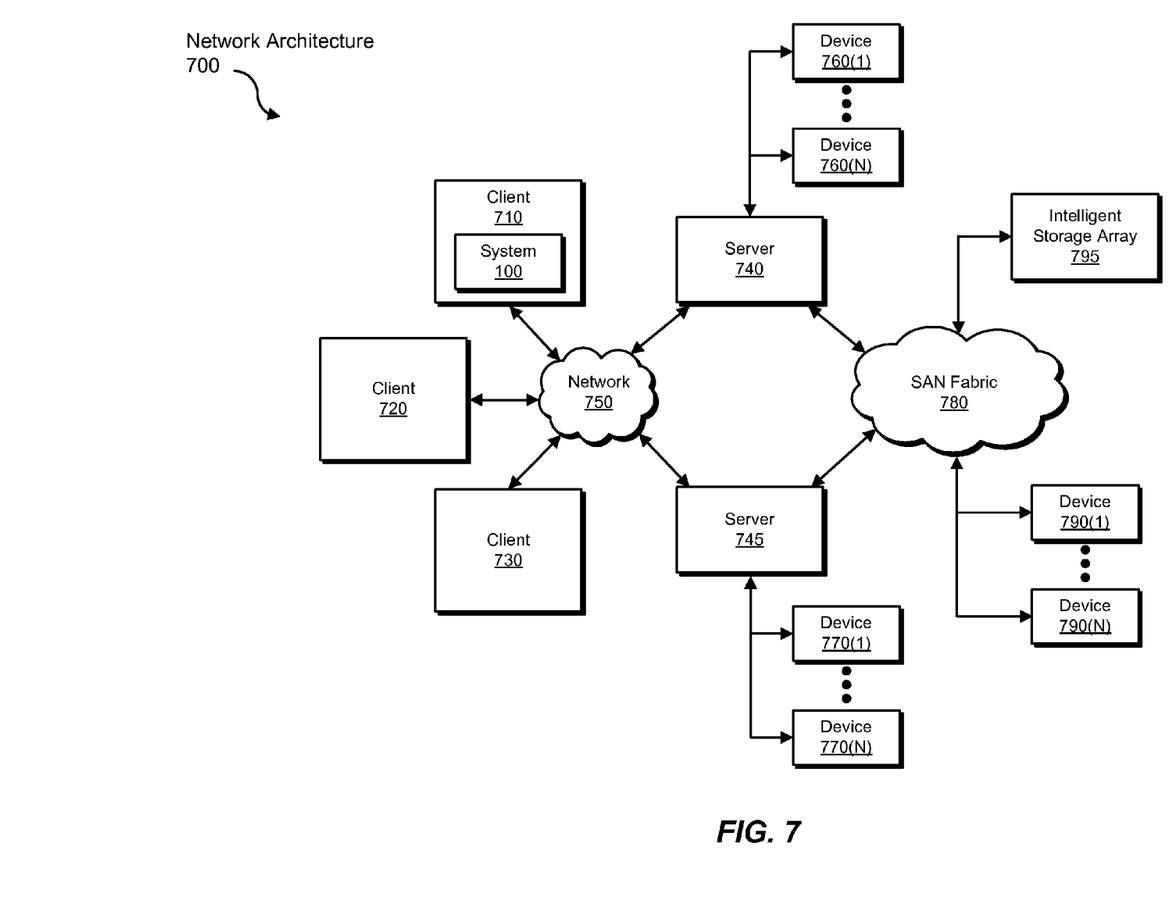
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, creating, updating, associating, determining, closing, modifying, attempting, scanning, querying, and removing steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a file to be transformed, transform the file into a malware scan result, output a result of the transformation to an output device (e.g., a monitor), use the result of the transformation to perform a remediation on the file (e.g., delete the file, quarantine the file, etc.), and/or store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting malware, at least a portion of the method being performed by a computing device comprising at least one processor, the method comprising:

identifying a file represented within a file system by a file name;

identifying a creation of a hard link to the file, the hard link representing the file within the file system by an additional file name;

updating a database with an association between the file name and the additional file name in response to the creation of the hard link to the file;

identifying a file-closing operation within the file system and then determining that a target file name used in the file-closing operation was removed from the file system after the file-closing operation;

querying the database using the target file name in response to determining that the target file name was removed after the file-closing operation and, in response to the querying and based on the association, identifying an existing file name representing the file, the target file name matching one of the file name and the additional file name and the existing file name comprising one of the file name and the additional file name that does not match the target file name;

scanning the existing file name for malware in response to the file-closing operation instead of scanning the target file name because the target file name was removed from the file system.

2. The computer-implemented method of claim 1, further comprising:

identifying a file-renaming operation within the file system to change the file name to a new file name;

updating the association within the database to associate the new file name with the additional file name in response to the file-renaming operation.

3. The computer-implemented method of claim 1, further comprising:

identifying a file-renaming operation within the file system to change the additional file name to a new file name;

updating the association within the database to associate the new file name with the file name in response to the file-renaming operation.

4. The computer-implemented method of claim 1, wherein updating the database with the association between the file name and the additional file name comprises associating the additional file name with an inode of the file within the database.

5. The computer-implemented method of claim 1, wherein the file-closing operation closes the file via the target file name after modifying the file via the target file name to introduce malware to the file.

6. The computer-implemented method of claim 1, wherein determining that the target file name of the file-closing operation was removed from the file system after the file-closing operation comprises attempting and failing to access the target file name.

7. The computer-implemented method of claim 6, wherein attempting and failing to access the target file name comprises attempting to scan the target file name for malware in response to the file-closing operation.

8. The computer-implemented method of claim 1, wherein identifying the creation of the hard link to the file comprises creating the hard link to the file in response to identifying a previous creation of a prior hard link to the file.

9. The computer-implemented method of claim 8, further comprising:

identifying a removal of a penultimate hard link to the file;

removing the hard link to the file in response to identifying the removal of the penultimate hard link.

10. The computer-implemented method of claim 1, further comprising:

identifying a removal of the hard link to the file;

updating the database to remove the association between the file name and the additional file name.

11. A system for detecting malware, the system comprising: an identification module programmed to:

identify a file represented within a file system by a file name; identify a creation of a hard link to the file, the hard link representing the file within the file system by an additional file name;

an update module programmed to update a database with an association between the file name and the additional file name in response to the creation of the hard link to the file;

a determination module programmed to identify a file-closing operation within the file system and then determine that a target file name used in the file-closing operation was removed from the file system after the file-closing operation;

a querying module programmed to query the database using the target file name in response to determining that the target file name was removed after the file-closing operation and, in response to the querying and based on the association, identify an existing file name representing the file, the target file name matching one of the file name and the additional file name and the existing file name comprising one of the file name and the additional file name that does not match the target file name;

a scanning module programmed to scan the existing file name for malware in response to the file-closing operation instead of scanning the target file name because the target file name was removed from the file system;

at least one hardware processor configured to execute the identification module, the update module, the determination module, the querying module, and the scanning module.

12. The system of claim 11, further comprising a renaming-update module programmed to:

identify a file-renaming operation within the file system to change the file name to a new file name;

update the association within the database to associate the new file name with the additional file name in response to the file-renaming operation.

13. The system of claim 11, further comprising a renaming-update module programmed to:

identify a file-renaming operation within the file system to change the additional file name to a new file name;

update the association within the database to associate the new file name with the file name in response to the file-renaming operation.

14. The system of claim 11, wherein the update module is programmed to update the database with the association between the file name and the additional file name by associating the additional file name with an inode of the file within the database.

15. The system of claim 11, wherein the file-closing operation closes the file via the target file name after modifying the file via the target file name to introduce malware to the file.

16. The system of claim 11, wherein the determination module is programmed to determine that the target file name of the file-closing operation was removed from the file system after the file-closing operation by attempting and failing to access the target file name.

17. The system of claim 16, wherein the determination module is programmed to attempt to access the target file name by attempting to scan the target file name for malware in response to the file-closing operation.

18. The system of claim 11, wherein the identification module is programmed to identify the creation of the hard link to the file by creating the hard link to the file in response to identifying a previous creation of a prior hard link to the file.

19. The system of claim 18, wherein the identification module is further programmed to:

identify a removal of a penultimate hard link to the file;

remove the hard link to the file in response to identifying the removal of the penultimate hard link.

20. A non-transitory computer-readable-storage medium comprising one or more computer-executable instructions that, when executed by at least one processor of a computing device, cause the computing device to:

identify a file represented within a file system by a file name;

identify a creation of a hard link to the file, the hard link representing the file within the file system by an additional file name;

update a database with an association between the file name and the additional file name in response to the creation of the hard link to the file;

identify a file-closing operation within the file system and then determine that a target file name used in the file-closing operation was removed from the file system after the file-closing operation;

query the database using the target file name in response to determining that the target file name was removed after the file-closing operation and, in response to the querying and based on the association, identify an existing file name representing the file, the target file name matching one of the file name and the additional file name and the existing file name comprising one of the file name and the additional file name that does not match the target file name;

scan the existing file name for malware in response to the file-closing operation instead of scanning the target file name because the target file name was removed from the file system.

* * * * *